United States Patent
Feuer et al.

[11] 3,864,362
[45] Feb. 4, 1975

[54] ISO FLAVONES

[75] Inventors: László Feuer; Mihály Nógradi; Ágnes Gottsegen; Borbála Vermes; János Streliszky; András Wolfner; Loránt Farkas; Sándor Antus; Mária Kovács; Née Toth, all of Budapest, Hungary

[73] Assignee: Chinoin Gyogyszer-Es Vegyeszeti Termekek Gyara Rt., Budapest, Hungary

[22] Filed: June 27, 1973

[21] Appl. No.: 374,056

Related U.S. Application Data

[63] Continuation-in-part of Ser. No. 146,773, May 25, 1971, Pat. No. 3,833,730.

[30] Foreign Application Priority Data
   May 27, 1970  Hungary.............................. Cl-996

[52] U.S. Cl............................. 260/345.2, 424/283
[51] Int. Cl............................................. C07d 7/32
[58] Field of Search................................. 260/345.2

[56] References Cited
UNITED STATES PATENTS
3,352,754  11/1967  Gazave...................... 260/345.2 X
3,707,476  12/1972  Freedman.................. 260/345.2 X Primary Examiner—John M. Ford
Attorney, Agent, or Firm—Karl F. Ross

[57]  ABSTRACT

Catabolic (weight-reducing) agent comprises as active ingredient at least one compound of the formula

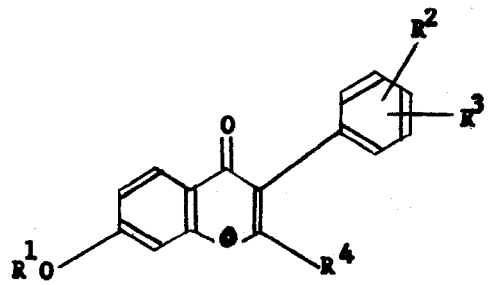

wherein R' is carbethoxymethyl, ethoxyethyl, butyl or hexyl, $R^2$ and $R^3$ are hydrogen or methoxy, and $R^4$ is hydrogen or methyl.

5 Claims, No Drawings

ISO FLAVONES

CROSS-REFERENCE TO RELATED APPLICATION

The present application is a Continuation-in-Part of our copending application Ser. No. 146,773 filed May 25, 1971 and entitled NEW METABOLIC COMPOSITIONS, now U.S. Pat. No. 3,833,730.

FIELD OF THE INVENTION

The present invention relates to isoflavone derivatives having catabolic and anorexigenic properties suitable for use in the treatment of animal subjects to promote metabolism and reduce weight, to an improved method of making these compounds, to a method of making a weight-reducing composition and to a weight-reducing composition including such compounds.

BACKGROUND OF THE INVENTION

In order to reduce protein deficiency in nutrition or to terminate it, thorough and significant research is being carried out throughout the world. One of the most obvious ways to achieve this objective is the use of additives to nutrients and feed which improve the utilization of the nutrients introduced into the organism. In animal husbandry, these additives result in higher body-weight increase for an identical feed consumption and breeding period.

However, it has been rather difficult to develop an appropriate substance for increasing animal body weight since the use of substances with hormonal effects and of antibiotics is not permitted in most of the countries.

Isoflavone compounds have been subjected to a detailed investigation from the aspect of their body weight increasing effect. These compounds are rather widespread in plants, and a great number of them show oestrogenic properties. (cf. Virtanen, A.J.: Angew, Chem. 70, 544, 1958; Virtanen, A.J., Hietala, P.K.: Acta Chem. Scand. 12, 579, 1958). Grazing animals become infertile on consuming certain varieties of clover; research into this problem has shown that genistein and daidzein present in the plants consumed by pasturing animals are responsible for this effect because of their marked oestrogenic action (Chang, E.W. et al.: Ann. N.Y. Acad. Sci. 61, 625, 1955).

For the determination of the oestrogenic effect of isoflavones a reliable method has been evolved by East, J. (J. Endocrin. 13, 94, 1955). Since that time a number of authors have dealt very thoroughly with this problem (Matrone, G, et al.: Nutrition 59, 235, 1956; Gabor, M.: Naturwiss. 46, 650, 1959; Crabbe P. et al.: J. Am. Chem. Soc. 85, 5258, 1958).

The system described in the aforementioned parent application relates primarily to an animal feed containing as an active ingredient at least one compound of the formula

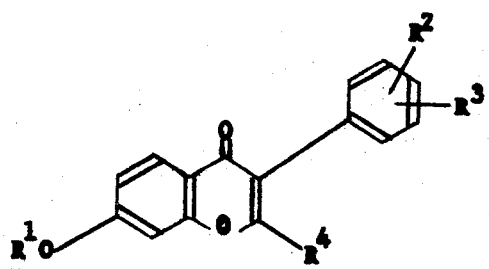

or a salt thereof, in which formula $R^1$ represents a substituted or unsubstituted and/or unsaturated alkyl group, $R^2$ and $R^3$ represent hydrogen, an alkoxy, nitro, halogen, sulpho or hydroxy group, and $R^4$ is hydrogen, an alkyl or —COOH group.

The metabolic composition can be favorably applied as a feed additive. In that case one of the compounds of formula I, or a salt, is added to the feed in amounts from 0.00002 to 0.1 %, prior to or after the admixture of further additives. In human therapy, doses from 0.2 to 100.0 mg per kg of body weight are applied orally, parenterally or rectally as anabolic, anticatabolic or roborating agents and, as agents increasing muscle effectivity.

The active ingredient in the metabolic composition according to the present invention may have, if desired, also substituents on the alkyl group $R^1$. Substituents in this position may be a heterocycle, a dialkylamino group, a carbethoxy, hydroxyalkyl, alkoxyalkyl or aryl or a substituted aryl group. The $R^1$ alkyl group may be substituted with a nitrogen containing heterocyclic group.

If desired, the compounds of the formula I are mixed with further additives. Substances with biological activity such as vitamins, aminoacids, choline chloride, salts of mineral acids, trace elements and other known substances of biological importance, are suitable. The feed additive can be applied in premixes, in admixture with other components possessing biological effects. As further, additives various diluents, solvents, sliding and molding substances, and carriers may be used. The feed additive can be mixed to the feed as a powder, granulate, powder mixture, emulsion or suspension. It is also possible to use the feed composition in mixtures added to the drinking water of the animals.

For use in human therapy, the compounds of the formula I may be processed by the known methods of drug production to tablets, coated tablets (dragées), powder mixtures, solutions, emulsions or suspensions, primarily for oral administration. When applied as nutrient or roborant in human therapy, respectively, it is similarly possible to prepare combinations, applying the compounds of the formula I or their salts according to the present invention preferably in vitamin-containing mixture.

The prior application disclosed compounds of formula

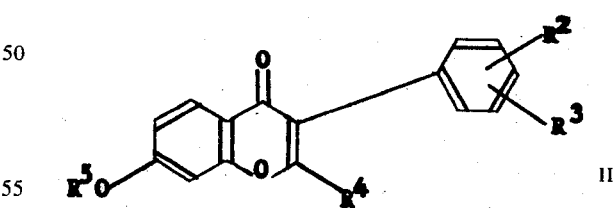

wherein $R^2$, $R^3$ and $R^4$ have the same definitions as given for formula I, while $R^5$ represents an optionally more and/or substituted alkyl group having a carbon chain of moore than two carbon atoms and the salts of these compounds. The alkyl group represented by $R^5$ may bear, if desired, a substituent as well. Substituents of this type may be aromatic or heteroaromatic rings, dialkylamino groups (such as dimethylamino, diethylamino groups), a carbethoxy group and alkoxy, alkyl or hydroxyalkyl groups. The heterocyclio ring preferably contains a nitrogen atom and/or an alkoxy, halogen, alkyl or —COOH group as a further substituent.

The compounds of the formula II can be made by a process wherein ketones of the formula

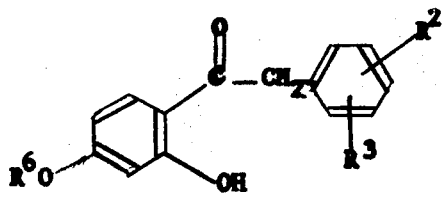

III a. are reacted with an alkyl orthoformate in the presence of a basic catalyst, or
b. are reacted with hydrogen cyanide and/or cyanides in the presence of hydrogen halide, or
c. are reacted with an alkyl formate in the presence of an alkali metal, or
d. are reacted with an alkyl oxalyl halogenide, followed, if desired, by saponification and/or decarboxylation of the obtained isoflavone ester, or
e. are reacted with an organic anhydride, or
f. are reacted with a N,N-dialkyl acid amide in the presence of phosphorus oxychloride.

Alternatively (variant (g)) 2-hydroxy-isoflavanone derivatives of the formula

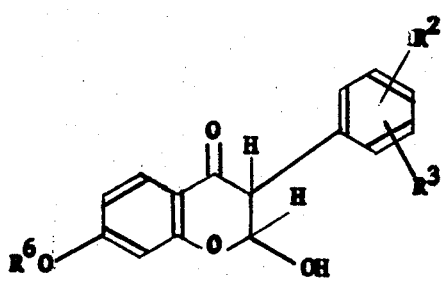

IV are dehydrated, and finally, if necessary, the $R^6$ group is converted into an $R^5$ group and/or the compounds are converted into salts or respectively, liberated from their salts.

In the formulae $R^2$ and $R^3$ represent hydrogen, a halogen, alkoxy, nitro, sulpho or hydroxy group, $R^4$ is hydrogen, an alkyl or —COOH group, $R^5$ is a substituted or unsubstituted saturated or unsaturated alkyl group with a carbon chain longer than two carbon atoms, $R^6$ is hydrogen, or, if desired, a substituted or unsubstituted alkyl group or an acyl group.

In carrying out variant (a) of the process, the preferred method is to react an appropriately substituted ketone with an orthoformic ester in an aprotic solvent of higher boiling point. Pyridine, dimethyl formamide or diethyleneglycol dimethylether are used as solvents, while preferably prperidine, morpholine, pyrrolidine and other secondary amines serve as basic catalysts.

In carrying out variant (b), the preferred method is to react the ketones with hydrogen cyanide, in an aprotic solvent, in the presence of dry gaseous hydrochloric acid or of other hydrogen halides and Lewis acids. In this reaction, also aprotic solvents of nonbasic nature, preferably diethylether or other dialkylethers can be used. Zinc chloride or similarly acting Lewis acids may be used as catalysts. The reaction is carried out with hydrogen cyanide or with one of its appropriate salts, preferably with zinc cyanide. The mixture may be saturated with dry gaseous hydrogen chloride, and lastly, the formed substituted α-formimino -2-hydroxy-phenyl-benzyl-ketone hydrochlorides are decomposed by treatment with water.

In carrying out variant (c) of the process, ketones of the aforementioned formula

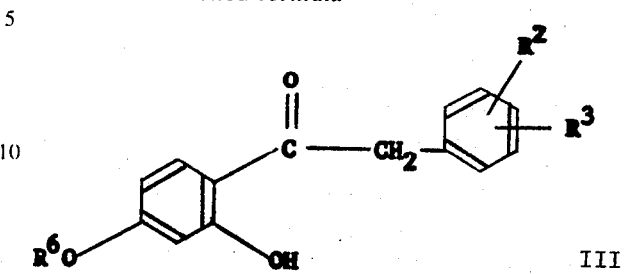

III are reacted with alkyl formates in the presence of an alkali metal. A preferred method is to dissolve an appropriately substituted 2-hydroxy-phenyl-benzyl-ketone in ethyl formated, and adding the solution dropwise to powdered sodium metal, then decomposing the reaction mixture with water, and separating the formed isoflavone.

According to variant (d) of the process appropriately substituted 2-hydroxy-phenyl-benzyl ketones are reacted with alkyl oxalyl halides. The formed 2-carbalkoxy-isoflavone derivative is converted, if desired, into an isoflavone derivative unsubstituted in position 2 by hydrolysis of the ester group followed by decarboxylation. This process is carried out preferably with methyl or ethyl oxalyl chloride in the presence of a basic acid-binding agent in an appropriate aprotic solvent (preferably pyridine or another tertiary amine capable of binding acids).

According to varient (e) of the process, the appropriately substituted 2-hydroxy-phenyl-benzyl ketone is reacted with organic acid anhydrides in the presence of a basic catalyst. The anhydrides of acetic, propionic or benzoic acids can be used as organic acid anhydrides. The anhydride is heated in the presence of a basic catalyst, preferably of the alkali metal salt of the acid component of the anhydride or of a tertiary amine, in the absence of solvents or in an aprotic solvent of higher boiling point such as pyridine or dimethyl formamide.

In carrying out variant (f) of the process, the ketone is reacted with N,N-dialkyl acid amides in the presence of phosphorous oxychloride, preferably in a way such that the appropriately substituted 2-hydroxy-phenyl-benzyl ketone is heated with the N,N-dialkyl acid amide (dimethyl formamide or dimethyl acetamide) and phosphorus oxychloride, and the N,N-dialkyl acid amide itself constitutes the solvent.

In carrying out variant (g) of the process 2-hydroxy-isoflavanones of the formula IV are dehydrated by heating alone or in an acidic medium in a polar solvent.

In the course of the process in the first step, from the compounds of the formula III or IV derivatives may be obtained in which the substituent $R^6$ is not the $R^5$ group desired to be present in the end product. In these cases the $R^6$ group may be converted into an $R^5$ group. This operation can be carried out by the partial or complete alkylation of mono- and poly-hydroxy-isoflavones, respectively. The alkylation is preferably performed with alkyl or substituted alkyl halides, alkyl sulphates, olefins and epoxides, preferably in a way such that the alkylating agents are heated with the isoflavones to be alkylated, in appropriate solvents, especially ketones, dimethyl formamide or ethers having a longer carbon chain; in the case of haloid compounds alkylation is carried out in the presence of an acid-binding agent such as an alkali carbonate, and in the case of alkyl bromides and alkyl chlorides preferably in the presence of an alkali iodide as additive.

The transformation of $R^6$ to $R^5$ can also be carried out by the partial or complete deacylation and, respectively, the partial or complete dealkylation of acyloxy- and polyacyloxy-, alkyloxy- and polyalkyloxy-isoflavones. Acyloxy- and polyacyloxy isoflavones are formed when the procedure of variant (e) is carried out with di- and polyhydroxy-phenyl-benzyl ketones, having a hydroxy group in the 2 position. Deacylation is preferably preformed in an acidic or alkaline medium in the presence of a polar solvent.

The operation can also be preformed by the decarboxylation of isoflavone-2-carboxylic acids. Isoflavone-2-carboxylic acids are formed in variant (d) of the process and their decarboxylation may be carried out by heating them in the presence of catalysts such as powdered copper or in the absence of catalysts.

On the basis of the abundant literature studies concerning the estrogenic properties of isoflavones, and of the data of our research in this field, we were able to produce isoflavone compounds which are devoid of any estrogenic effects.

It was observed during the treatment period that the experimentally treated animals showed an increased vitality, and that the weight increase was mainly due to the increase of the muscle mass. This was particularly evident in pig fattening trials when in case of bacon pigs the ratio of pigs of class A, low in fat, was significantly higher.

In rats, also the effect exerted on the reproductive organs was separately examined. The capability of reproduction and the number of brood were in case of males and females pretreated with the active ingredient the same as that on untreated controls.

In an investigation on the uptake and excretion of C-14 labeled isoflavones it was found that the uptake is rather quick both in case of oral and of intramuscular administration. After oral administration, half of the ingredient introduced was excreted with urine while the other half with faeces.

OBJECTS OF THE INVENTION

It is, therefore, the principle object of the present invention to extend the principles of the aforementioned copending application.

Another object of this invention is to provide an improved compound or group of compounds for a catabolic and anorexigenic properties.

Another object of the invention is to provide an improved method of making a compound or group of compounds having catabolic or anorexigenic properties.

Still another object of the invention is to provide a method of making an improved weight-reducing composition using a catabolic or anorexigenic compound.

It is also the object of the invention to provide a method of making a composition of the latter type.

DESCRIPTION OF THE INVENTION

As noted earlier, we have found that a limited group of compounds generically described above have catabolic and anorexigenic properties suitable to enable them to be used as weightreducing pharmaceutically or biologically effective substances. More particularly, we have discovered that compounds of the formula:

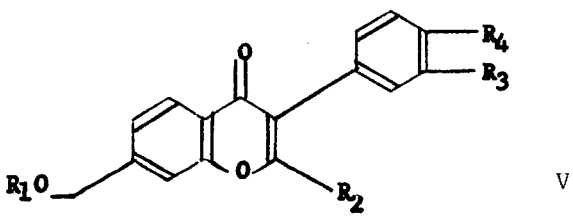

V wherein $R_1$ is carbethoxymethyl, ethoxyethyl, butyl and hexyl, $R_2$ is hydrogen or methyl, and $R_3$ and $R_4$ are hydrogen or methoxy, may be used for the treatment of animal subjects to promote metabolism, limit weight gain and effect a weight reduction in the animal subject.

These compounds can be described as 7-substituted isoflavones having carbethoxy, methoxy, 2-ethoxyethoxy, isobutoxy and hexyloxy groups at the 7 position; hydrogen or methyl at the 2 position and hydrogen or methoxy at the 3' and 4' positions. Typical compounds of this type and the preferred compounds of the present invention are 7-isobutoxyisoflavone; 7-n-hexyloxy-2-methyl-isoflavone; 7-carbethoxymethoxy-3', 4'-methoxy-2-methylisoflavone, 7-(2-ethoxyethoxy)-isoflavone and 7-(2-ethoxy-ethoxy)-2-methylisoflavone.

Thus according to our extended pharmacological and biological experiments, we have come to the surprising conclusion that compounds having a related chemical structure to compounds of anabolic effect, have the contrary (e.g. catabolic) effect, they reduce the utilization of nutriments and decrease the body-weight. These compounds exhibit no toxic effect.

The compounds of catabolic effect exert their activity when added in a very low concentration of about 0.0001–0.1% to fodder. The catabolic effect may be utilized in human therapy. The above compounds are useful anorexigenic agents, which do not effect heart-function, circulation and nervous system.

The listed compounds have the following structural formulae:

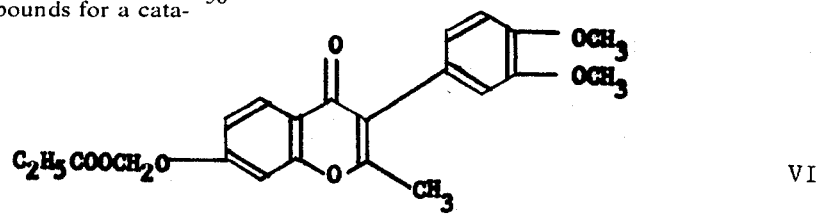

VI 7-carbethoxy-methoxy-3', 4'-dimethoxy-2-methylisoflavone;

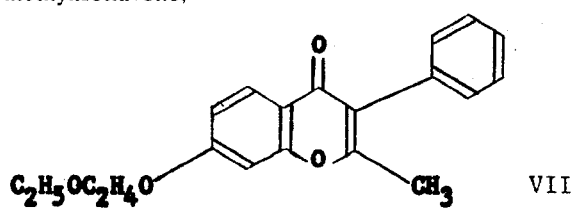

VII 7-(2-ethoxy-ethoxy)-2-methylisoflavone;

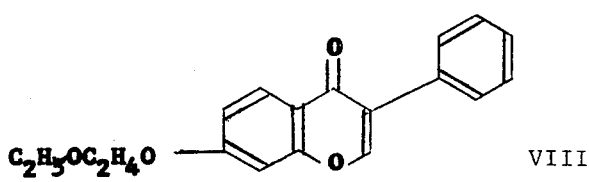

7-(2-ethoxy-ethoxy)-isoflavone;

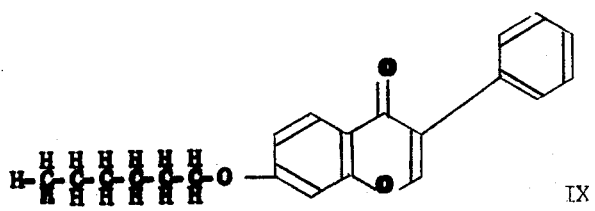

7-n-hexyloxyisoflavone;

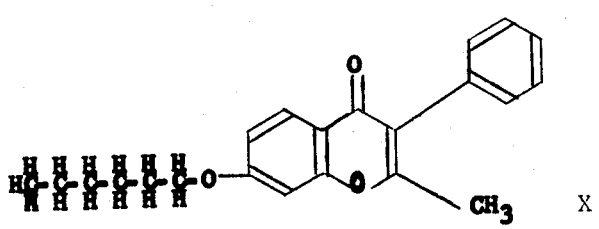

7-n-hexyloxy-2-methyl-isoflavone; and

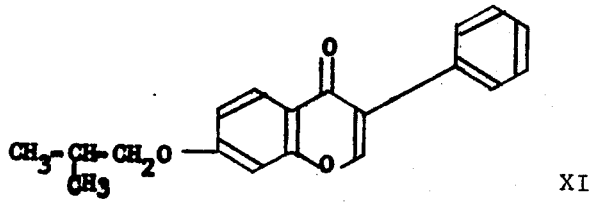

7-isobutoxylsoflavone;

Best results are obtained with 7-isobutoxyisoflavone.

Chickens, rabbits and rats, which received a fodder containing 2 g/100 kg of one of the above compounds showed a decrease of weight-gain by 8–20% in a comparison to control animals, under identical fodder utilization.

When these compounds are used in human or veterinary animal treatment they may be used directly or incorporated with a pharmaceutical excipient in tablets, pills coated pills or dragees or oral administration, the dosage including 10 to 100 mg of the compound per tablet, pill, or dragée. Two or three tablets may be used daily and the process can be continued until the desired weight reduction is obtained.

The pharmaceutical excipients or vehicles with which the active compound can be combined may be talc, calcium carbide, magnesium carbide, water, sweetening agents, stabilizing agents, emulsifying and wetting agents, all well known in the art.

In general, a suitable composition for oral administration may include 100 mg of the active ingredient, 0.084 grams potato starch, 0.01 grams of magnesium stearate and 0.006 grams of polyvinylpyrrolidone for a total weight of 0.2 grams and per tablet. Equal amounts of the compound and a cellulose filler may be combined to yield orally administratable tablets of a similar weight.

The preferred dose is 10 to 200 mg of the active compound, administered twice daily.

SPECIFIC EXAMPLES

Details of the procedure are to be found in the examples given below.

EXAMPLE 1

27 g of 2-hydroxy-4-isobutyloxy-phenyl-benzyl ketone, 22 g of ethyl orthoformate and 5 g of morpholine are boiled for 8 hours in 200 ml of dimethyl formamide. The ethanol formed during the reaction is removed through a fractionation head. Then the major part of solvent is distilled off in vacuum and the residue is diluted with dilute aqueous hydrochloric acid. The crude product is filtered and recrystallized from acetone, yielding 7-isobutyloxy-isoflavone.

By applying a similar method, 7-n-butyloxy-isoflavone, m.p. 152°–153° C, can be prepared from 4-n-butyloxy-2-hydroxy-phenyl-benzyl-ketone (m.p. 71°–73° C), and 7-n-hexyloxy-isoflavone from 4-n-hexyloxy-2-hydroxy-phenyl-benzyl ketone.

EXAMPLE 2

28.6 g of 2-hydroxy-4-n-butyloxy-phenyl-benzyl ketone are dissolved in 50 ml of anhydrous ether, 25 g of zinc cyanide are added, and the solution is saturated, under cooling, with dry hydrogen chloride gas. After allowing the mixture to stand for 24 hours, the solvent is decanted from the separated oil, the oil triturated with ether, the ether is decanted, and the residue is heated with 1,000 ml of water for 30 minutes on a water bath. The product which precipitates on cooling is filtered, and recrystallized from a mixture of methanol and acetone, thus 15 g of 7-n-butyloxy-isoflavone are obtained, which is identical with that obtained in Example 1.

7-Isobutyloxy-isoflavone and 7-n-hexyloxy-isoflavone already described in Example 1 can be produced in a similar way.

EXAMPLE 3

A solution of 18 g of 2-hydroxy-isobutyloxy-phenyl-benzyl ketone in 150 g of ethyl formate is added in small portions under cooling to 9 g of a powdered sodium. After allowing the reaction mixture to stand for some hours, it is treated with ice water containing hydrochloric acid, the ethyl formate is distilled off, the residual aqueous mixture is boiled for an hour, and the product precipitated on cooling is recrystallized from acetone, to yield of 7-isobutyloxy-isoflavone. In a similar way, 7-n-butyloxy-isoflavone and 7-n-hexyloxy-isoflavone already described in Example 1 can also be produced.

EXAMPLE 4

To a solution of 13.5 g of 2-hydroxy-4-isobutyloxy-phenyl-benzyl ketone in 120 ml of pyridine, 11 ml of ethyl-oxalyl chloride are added under cooling. After allowing the reaction mixture to stand for a day, it is diluted with water, extracted with chloroform and repeatedly shaken with a 10% aqueous hydrochloric acid solution. On evaporating the solution, the residue is treated for 5 hours with a mixture of 100 ml of methanol and 50 ml of a 10% aqueous solution of sodium hydroxide, the methanol is distilled off, and the aqueous solution is acidified. The product is filtered, thoroughly dried and, after addition of 5 g of powdered copper, heated to 250° C. On completion of the evolution of gas, the residue is crystallized from methanol, yielding 7-isobutyloxy-isoflavone.

EXAMPLE 5

28.6 g of 2-hydroxy-4-n-butyloxy-phenyl-benzyl ketone and 25 g of anhydrous sodium acetate are boiled for 14 hours with 120 ml of acetic anhydride under a reflux condenser. The reaction mixture is poured into water, allowed to stand and the precipitated substance is recrystallized from a mixture of methanol and acetone, yielding 25 g of colorless crystals of 7-n-butyloxy-2-methyl-isoflavone, m.p. 91°–93° C. In a similar way, 7-n-hexyloxy-2-methyl-isoflavone and 7-(2-ethoxy-ethoxy) -2-methyl-isoflavone can also be produced.

7-carbethoxy-methoxy-3',4'-dimethoxy-isoflavone, m.p. 149°–152° C.

7-carbethoxy-methoxy-3',4'-dimethoxy-2-methyl-isoflavone, m.p. 132°–134° C;

7-(2-ethoxy-ethoxy)-isoflavone, m.p. 139°–140° C;

7-(2-ethoxy-ethoxy)-2-methyl-isoflavone, m.p. 104°–105° C; and 7-(2-ethoxy-ethoxy)-3', 4'-dimethoxy-2-methyl-isoflavone, m.p. 132°–133° C can be prepared.

EXAMPLE 6

12 g of 7-hydroxy-isoflavone are boiled for 2 hours under reflux condenser with 10 g of potassium carbonate and 9 g of sec-butyl bromide in 40 ml of dimethyl formamide. On pouring the reaction mixture on water, the separated product is recrystallized from acetone, yielding 12 g of 7-sec-butyloxy-isoflavone, m.p. 87°–89° C. In a similar way, also 7-sec-butyloxy-2-methyl-isoflavone, m.p. 107°–109° C, all the other isoflavone derivatives described in Example 5 can be prepared.

PHARMACOLOGICAL EFFECT OF 7-ISOBUTOXY-ISOFLAVONE

This compound possesses anorexigenic particularly valuable properties. When administered to rats in a dosage of 2mg/kg body-weight after a treatment of 1 month, the body-weight of the rats considerably decreased as compared to control animals. The rate of weight reduction amounted to 8-10%.

When determined by the Schollender-method, the oxygen consumption ($O_2$ ml/dm$^2$ per hour body surface) increases significantly as compared to the control (from 85 to 93, deviation ±3).

In the case of hypocaloric feeding after 3 weeks oxygen-consumption increases from 87 ± 5 to 108 ± 6 as a result of a 7-isobuthoxy-isoflavone dosage disclosed above ($p < 0,01$).

The same compound slightly reduces the serum cholesterol level.

The new compound does not influence the relative weight of various organs, but the fat tissue becomes visibly thinner at various locations.

The new compound significantly increases the oxygen-consumption augmenting effect of adrenaline.

The new compound does not exhibit any effect on the central nervous system.

Since, according to biochemical tests, 7-isobutoxy-isoflavone increases the oxygenation of liver mitochondria, it is possible that the anorexigenic effect occurs at the cell-level so that the biochemical mechanism of energy liberation tends towards increased combustion.

The human and animal dosage of 7-isobutyloxy-isoflavone may vary between wide ranges and depends on the circumstances of the given case. It preferably is administered in a total daily dose of from about 20 mg to about 1,000 mg. Preferred daily dosages comprise 10—200 mg active compound administered three-times a day.

A tablet suitable for oral administration to humans in the dosage indicated is pressed from the following composition:

| | |
|---|---|
| 7-isobutyloxyisoflavone* | 0.100g |
| potato starch (amylum solani) | 0.084g |
| magnesium stearate | 0.010g |
| polyvinylpyrrolidine | 0.006g |
| | 0.200g |

The tablets are stable at a temperature of 40°–55° C and desintegration time is 6 to 8 minutes.

Another tablet may be pressed from the following composition:

| | |
|---|---|
| 7-isobutyloxyisoflavone* | 0.1g |
| Avicel (Encompress) | 0.1g |
| | 0.2g |

Where weight gain control in animals is required the following compositions may be used: ,221

Formulation of poultry raising feed:

| | |
|---|---|
| Maize | 40.0 kg |
| Feed wheat | 20.0 kg |
| Bran | 6.0 kg |
| Extracted Soybeans | 13.0 kg |
| Extracted groundnut | 11.5 kg |
| Powdered alfalfa | 1.4 kg |
| Extracted sunflower seed | 4.0 kg |
| Potassium-phosphorus composite "Foszkal" | 0.5 kg |
| Feed lime | 2.3 kg |
| Feed sodium chloride | 0.3 kg |
| Vitamin premix 2 | 0.5 kg |
| Mineral premix II | 0.5 kg |
| Total: | 100.0 kg |

+2 g of 7-isobutyloxy-isoflavone*/100 kg of feed.

| | |
|---|---|
| Bran | 22.0 kg |
| Extracted soybeans | 15.0 kg |
| Extracted Groundnut | 6.0 kg |
| Powdered linseed | 14.0 kg |
| Powdered alfalfa | 4.0 kg |
| Powdered milk | 15.0 kg |
| Fish meal | 10.0 kg |
| Yeast | 2.0 kg |
| Feed lime | 6.0 kg |
| Feed sodium chloride | 1.5 kg |
| Vitamin premix | 3.0 kg |
| Mineral premix | 1.5 kg |
| Total: | 100.0 kg |

+2 g of 7-isobutyloxy-isoflavone/100 kg of feed.

*Note: The compounds of formulae VI-I may be substituted for the 7-isobutyloxyisoflavone.

We claim:

1. The catabolic and anorexigenic compound 7-isobutoxy-isoflavone.

2. The catabolic and anorexigenic compound 7-n-hexyloxy-2-methylisoflavone.

3. The catabolic and anorexigenic compound 7-carbethoxymethoxy-3', 4'-methoxy-2-methylisoflavone.

4. The catabolic and anorexigenic compound 7-(2-ethoxy-ethoxy)-isoflavone.

5. The catabolic and anorexigenic compound 7-(2-ethoxy-ethoxy)-2-methylisoflavone.

* * * * *